United States Patent
Day et al.

(10) Patent No.: US 8,613,071 B2
(45) Date of Patent: Dec. 17, 2013

(54) SPLIT TERMINATION FOR SECURE COMMUNICATION PROTOCOLS

(75) Inventors: Mark Stuart Day, Milton, MA (US); Case Larsen, Union City, CA (US); Shashidhar Merugu, Mountain View, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 1137 days.

(21) Appl. No.: 11/489,414

(22) Filed: Jul. 18, 2006

(65) Prior Publication Data

US 2007/0038853 A1 Feb. 15, 2007

Related U.S. Application Data

(60) Provisional application No. 60/707,804, filed on Aug. 10, 2005.

(51) Int. Cl.
*G06F 21/00* (2013.01)

(52) U.S. Cl.
USPC ............... 726/12; 726/4; 713/150; 713/153; 709/224; 709/225; 380/277

(58) Field of Classification Search
USPC ................. 709/224, 225; 713/153; 726/12
See application file for complete search history.

(56) References Cited

U.S. PATENT DOCUMENTS

| | | | |
|---|---|---|---|
| 6,094,485 A * | 7/2000 | Weinstein et al. | 380/30 |
| 6,104,716 A * | 8/2000 | Crichton et al. | 370/401 |
| 6,105,067 A * | 8/2000 | Batra | 709/227 |
| 6,175,869 B1 | 1/2001 | Ahuja et al. | |
| 6,212,636 B1 * | 4/2001 | Boyle et al. | 713/168 |
| 6,526,131 B1 | 2/2003 | Zimmerman et al. | |
| 6,584,567 B1 | 6/2003 | Bellwood et al. | |

(Continued)

FOREIGN PATENT DOCUMENTS

| | | |
|---|---|---|
| CN | 1615632 A | 10/2008 |
| EP | 1533982 A2 | 5/2005 |

(Continued)

OTHER PUBLICATIONS

Final Office Action for U.S. Appl. No. 12/826,430 mailed on Jun. 13, 2012, 24 pages.

(Continued)

*Primary Examiner* — Morshed Mehedi
(74) *Attorney, Agent, or Firm* — Park, Vaugnan, Fleming & Dowler LLP

(57) ABSTRACT

Transaction accelerators can be configured to terminate secure connections. A server-side accelerator intercepts a secure connection request that is from a client and that is directed to a server. The server-side accelerator responds to the secure connection request in place of the server, thereby establishing a secure connection between the client and the server-side accelerator. Alternatively, the server-side accelerator monitors the establishment of a secure connection between the client and the server. After the secure connection has been established, the server-side accelerator forwards security information to a client-side accelerator, enabling the client-side accelerator to assume control of the secure connection. As a result of this arrangement, the client-side accelerator is able to encrypt and decrypt data on the secure connection and accelerate it in cooperation with the server-side accelerator. In a further embodiment, the accelerated traffic between accelerators is carried across the network via another secure connection.

58 Claims, 8 Drawing Sheets

(56) References Cited

U.S. PATENT DOCUMENTS

| | | | |
|---|---|---|---|
| 6,643,701 B1 * | 11/2003 | Aziz et al. | 709/227 |
| 6,658,114 B1 * | 12/2003 | Farn et al. | 380/277 |
| 6,681,327 B1 | 1/2004 | Jardin | |
| 6,704,798 B1 * | 3/2004 | Mogul | 709/246 |
| 6,799,270 B1 * | 9/2004 | Bull et al. | 713/153 |
| 7,010,608 B2 * | 3/2006 | Garg et al. | 709/229 |
| 7,082,535 B1 | 7/2006 | Norman et al. | |
| 7,254,237 B1 * | 8/2007 | Jacobson et al. | 380/277 |
| 7,370,351 B1 * | 5/2008 | Ramachandran et al. | 726/8 |
| 7,543,146 B1 | 6/2009 | Karandikar et al. | |
| 7,661,131 B1 * | 2/2010 | Shaw et al. | 726/15 |
| 7,865,720 B2 | 1/2011 | Little et al. | |
| 7,904,951 B1 | 3/2011 | Ebrahimi et al. | |
| 8,020,201 B2 | 9/2011 | Adusumilli et al. | |
| 2001/0047474 A1 | 11/2001 | Takagi et al. | |
| 2002/0016911 A1 * | 2/2002 | Chawla et al. | 713/153 |
| 2002/0035681 A1 * | 3/2002 | Maturana et al. | 713/151 |
| 2002/0157019 A1 * | 10/2002 | Kadyk et al. | 713/201 |
| 2002/0163884 A1 * | 11/2002 | Peles et al. | 370/229 |
| 2003/0005280 A1 * | 1/2003 | Bobde et al. | 713/150 |
| 2003/0014628 A1 * | 1/2003 | Freed et al. | 713/155 |
| 2003/0014650 A1 | 1/2003 | Freed et al. | |
| 2003/0196084 A1 | 10/2003 | Okereke et al. | |
| 2003/0233539 A1 * | 12/2003 | Tardo et al. | 713/153 |
| 2004/0010596 A1 | 1/2004 | Hui | |
| 2004/0088542 A1 | 5/2004 | Daude et al. | |
| 2004/0243703 A1 * | 12/2004 | Demmer et al. | 709/224 |
| 2005/0001660 A1 | 1/2005 | Roy | |
| 2005/0021956 A1 | 1/2005 | Genty et al. | |
| 2005/0050362 A1 * | 3/2005 | Peles | 713/201 |
| 2005/0065799 A1 | 3/2005 | Dare et al. | |
| 2005/0081029 A1 | 4/2005 | Thornton et al. | |
| 2005/0108517 A1 * | 5/2005 | Dillon et al. | 713/150 |
| 2005/0138353 A1 | 6/2005 | Spies et al. | |
| 2005/0138359 A1 | 6/2005 | Simon et al. | |
| 2005/0144463 A1 | 6/2005 | Rossebo et al. | |
| 2005/0240777 A1 | 10/2005 | Keohane et al. | |
| 2005/0265327 A1 | 12/2005 | Buch et al. | |
| 2006/0005239 A1 | 1/2006 | Mondri et al. | |
| 2006/0036859 A1 | 2/2006 | Adams et al. | |
| 2006/0069719 A1 * | 3/2006 | McCanne et al. | 709/203 |
| 2006/0143700 A1 | 6/2006 | Herrmann | |
| 2006/0143702 A1 | 6/2006 | Hisada et al. | |
| 2006/0168210 A1 * | 7/2006 | Ahonen et al. | 709/225 |
| 2006/0190612 A1 | 8/2006 | Kahol et al. | |
| 2006/0209789 A1 | 9/2006 | Gupta et al. | |
| 2006/0253703 A1 * | 11/2006 | Eronen et al. | 713/156 |
| 2007/0074282 A1 | 3/2007 | Black et al. | |
| 2007/0199061 A1 * | 8/2007 | Byres et al. | 726/11 |
| 2009/0013399 A1 * | 1/2009 | Cottrell et al. | 726/12 |
| 2009/0220080 A1 | 9/2009 | Herne et al. | |

FOREIGN PATENT DOCUMENTS

| | | |
|---|---|---|
| JP | 2001-333110 A | 11/2001 |
| WO | 01/03398 A2 | 1/2001 |
| WO | 01/37068 A2 | 5/2001 |
| WO | 2005/001660 A2 | 1/2005 |
| WO | 2005/060202 A1 | 6/2005 |
| WO | WO2005060202 | 1/2007 |

OTHER PUBLICATIONS

Patent Examination Report No. 2 of Jul. 26, 2012 for Australian Patent Application No. 2006280301, 3 pages.

Patent Examination Report No. 2 of Aug. 8, 2012 for Australian Patent Application No. 2006280301, 3 pages.

Dierks et al. "The Transport Layer Security (TLS) Protocol Version 1.2" Network Working Group Request for Comments: 5246 (Aug. 2008).

Kuramochi et al. "Infrastructure Elements of EC sites(8) The SSL accelerator taking over cryptography" NIKKEI Communication pp. 228-229 (Jul. 2001).

Japan Patent Office (JPO) office action dated Feb. 24, 2011 for related JPO patent application JP2008-526050.

State Intellectual Property office of China office action for patent application CN200680037143.3 (Nov. 6, 2009).

State Intellectual Property office of China office actions for patent application CN200680037143.3 (Jun. 2, 2011).

International Search Report for PCT application PCT/US2006029158 (Jul. 13, 2007).

European Search Report for application EP06788639.0 (Jun. 10, 2011).

Office Action for Israel Patent Office Application No. 189388 (Feb. 2, 2012).

Office Action for U.S. Appl. No. 12/826,430 (Jan. 17, 2012).

Third Office Action, mailed on Apr. 20, 2012, for Chinese Patent Application No. 200680037143.3, 10 pages.

Final Office Acton for U.S. Appl. No. 12/327,681, mailed Jan. 17, 2013, 24 pages.

* cited by examiner

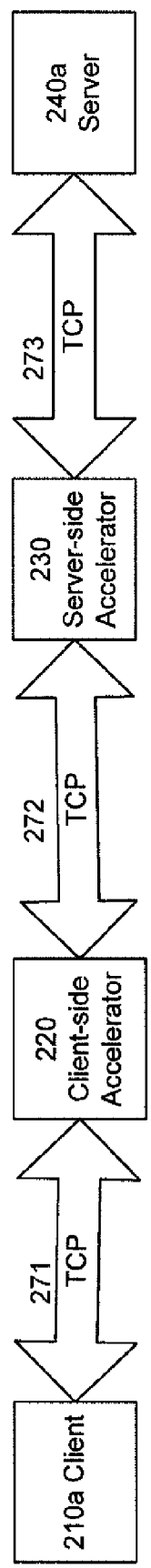
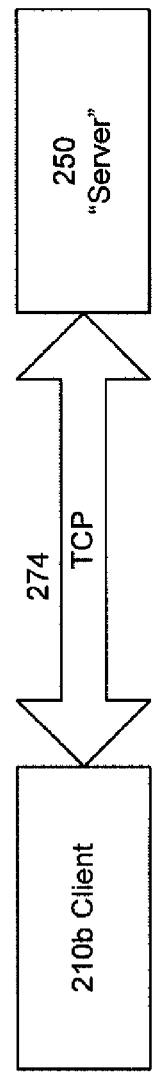
FIG. 2A (PRIOR ART)
FIG. 2B (PRIOR ART)

SPLIT TERMINATION FOR SECURE COMMUNICATION PROTOCOLS

CROSS-REFERENCES TO RELATED APPLICATIONS

This application claims priority to and incorporates by reference for all purposes U.S. Provisional Patent Application No. 60/707,804, filed Aug. 10, 2005, entitled "Split Termination for Secure Communication Protocols." This application is related to and incorporates by reference for all purposes U.S. patent application Ser. No. 10/285,315, filed 30 Oct. 2002, (now U.S. Pat. No. 7,120,666, issued 10 Oct. 2006) entitled "Transaction Accelerator for Client-Server Communication Systems" (hereafter "McCann I"), U.S. patent application Ser. No. 10/640,405, filed 12 Aug. 2003, (now U.S. Pat. No. 8,069,225, issued 29 Nov. 2011) entitled "Transparent Client-Server Transaction Accelerator" (hereafter "McCann III"), U.S. patent application Ser. No. 10/640,562, filed 12 Aug. 2003, (now U.S. Pat. No. 7,328,100, issued 8 Jan. 2008) entitled "Cooperative Proxy Auto-Discovery and Connection Interception" (hereafter "McCann IV"), patent application Ser. No. 10/640,459, filed 12 Aug. 2003, (now U.S. Pat. No. 7,650,416, issued 19 Jan. 2010) entitled "Content Delivery for Client-Server Protocols with User Affinities using Connection End-Point Proxies" (hereafter "McCann V"), U.S. Provisional Patent Application No. 60/663,174, filed 18 Mar. 2005, entitled "Improved Reliability and Availability of Distributed File Servers" (hereafter "Burman"), and U.S. Provisional Patent Application No. 60/663,366, filed 18 Mar. 2005, entitled "Connection Forwarding" (hereafter "Ly"), U.S. Provisional Patent Application No. 60/662,452, filed 15 Mar. 2005, entitled "Rules-Based Transaction Prefetching Using Connection End-Point Proxies, (hereafter "Wu").

BACKGROUND OF THE INVENTION

This application relates to the field of data networks, and to systems and methods of improving the performance of secure communications over data networks. For establishing secure communication across untrusted networks, a common approach is to use a protocol that uses both public-key cryptographic techniques and symmetric-key cryptographic techniques. Typically, public-key cryptography has better security properties but is more expensive computationally than symmetric-key cryptography. Thus, the two types of cryptography are combined by using public-key techniques to negotiate a symmetric cipher between two entities. The symmetric-key cipher is used for bulk data transfer between the entities. Secure Socket Layer (SSL) and Transport Layer Security (TLS) are widely-used examples of secure communication protocols that have this form, as is IPSec when security associations are negotiated using IKE's RSA-based mechanisms.

Secure communication protocols often add a computational cost to each secured connection. For server computers providing many simultaneous secure connections to client computers, the additional computational overhead imposed by secure communication protocols can be significant. To decrease the computational overhead of secure communication protocols for computers providing large numbers of secure connections, there are various devices that specialize in terminating secure connections. In general, these secure connection termination devices appear to client systems as a server providing a secure connection. The secure connection termination devices manage the cryptographic and other security related aspects of the connection, thereby relieving server systems providing services to client systems of the additional overhead imposed by the secure connection.

These secure connection termination devices are configured in much the same way as a server supporting secure communication protocols, including, for example, private keys, public keys, and security certificates. From a security perspective, secure connection termination devices are identical to servers and must be protected identically. If the security of a secure connection termination device is compromised, for example by the loss of the server private key, attackers would be able to set up a fake server that would be trusted by secure communication protocol client systems.

A transaction accelerator such as that described in McCann I can offer performance improvement for operations across a wide-area network (WAN), but only when the data being communicated is either intelligible (i.e. the transaction accelerator can interpret at least parts of the protocol) or repeating (i.e. identical data crosses the network in identical format). The use of secure communication protocols frustrates transaction acceleration, because cryptography (by design) renders encrypted data unintelligible and non-repeating.

A similar observation applies to local caching: even if a secure communication protocol request asks for an object that is locally cached, it is impossible to tell from the network traffic going between client and server. Some caching systems have included the capability to locally terminate secure communication protocols by loading the server keys and certificates of associated server systems. However, many of these devices do not include protected storage for keys and certificates, instead relying on security-through-obscurity. Because of the risks involved and the cost and complexity of key management at multiple edge locations, these caching systems are rarely used to terminate secure connections outside of large data centers. Instead, such secure communication protocols caching has been used more as a variant of secure communication protocols termination, in reverse-proxy configurations near the servers.

It is therefore desirable for a transaction accelerator or network caching system to provide transaction acceleration or caching in conjunction with secure communication protocol terminations. It is further desirable for a transaction accelerator or network caching system to support secure communication protocol terminations without requiring the deployment and maintenance of server private keys to edge devices.

BRIEF SUMMARY OF THE INVENTION

Transaction accelerators can be configured to terminate secure connections. In an embodiment, a server-side transaction accelerator, which is connected between one or more server systems and a wide-area network, is configured to terminate secure connections, while the client-side transaction accelerator is not so configured, to prevent problems associated with managing server private keys.

With such an arrangement of transaction accelerators, the client can initiate a secure connection with the server-side transaction accelerator, which appears to the client as a server. The client-side transaction accelerator can see the secure communication protocols exchange go by (to track progress) but cannot read any contents that have been encrypted by either end.

After negotiating the public-key portion of the secure connection setup, an embodiment of the server-side transaction accelerator cooperates with the client-side transaction accelerator in negotiating the symmetric-key portion of the secure connection setup. The client-side transaction accelerator uses the symmetric key for secure bulk data transfer between the client and server. As a result of this arrangement, the client-side transaction accelerator is able to decrypt the secure traffic and accelerate it in cooperation with the server-side transaction accelerator, even though the client-side transaction accelerator does not know the server private key. In a further embodiment, the accelerated traffic is still carried across the network on a secure connection.

BRIEF DESCRIPTION OF THE DRAWINGS

The invention will be described with reference to the drawings, in which:

FIGS. 2A-2D illustrate the actual and apparent interactions of prior transaction accelerators in facilitating communications between clients and servers;

DETAILED DESCRIPTION OF THE INVENTION

Figure 1:
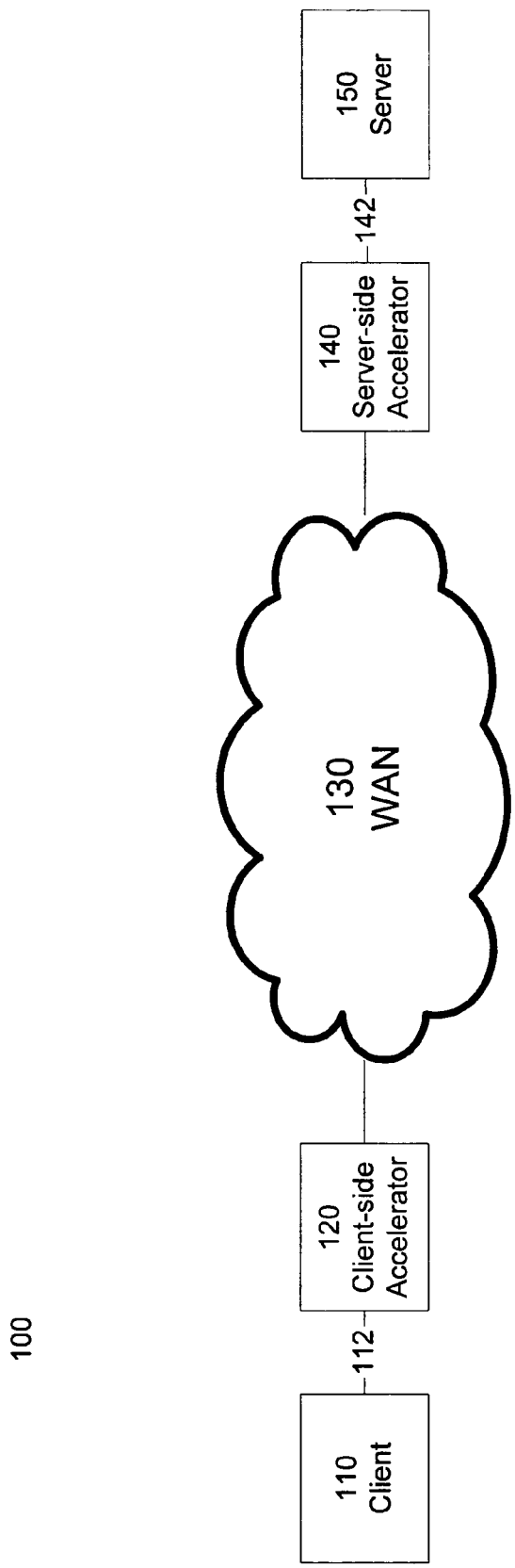
FIG. 1 shows a system using transaction accelerators suitable for use with embodiments of the invention.

FIG. 1 shows a system 100 using transaction accelerators suitable for use with embodiments of the invention. Client 110 communicates with server 150 across wide-area network (WAN) 130 via transaction accelerators 120 and 140. The transaction accelerators 120 and 140 may be identical devices or they may be specialized for their place in the network. For the sake of discussion, transaction accelerators 120 and 140 are referred to specifically as client-side and server-side transaction accelerators according to their roles and positions in system 100. This terminology is used only to clarify their role and position in system 100 and not to imply any required difference in implementation or packaging. In particular, "client" and "server" may refer to roles determined by the direction of a TCP connection, where the client initiates a connection and a server responds to that connection request. The client and server in this sense of connection roles may or may not correspond to other common uses of the term client and server.

The client 110 may be connected to the client-side accelerator 120 and WAN 130 by a variety of links, local area networks (LANs), or other communication technologies that may include routers, switches, firewalls, or other network devices. The server 150 likewise may be connected to the server-side accelerator 140 and WAN 130 by another variety of communication technologies that may, but need not, correspond to the technologies and configurations used on the client side. The WAN 130 may include a diverse collection of networks and internets interconnected by routers, gateways, firewalls, or other network devices. Some or all of WAN 130 may include Virtual Private Networks. Furthermore, the association of the client and server with accelerators may be based on the underlying physical arrangement of network connections or based on network characteristics such as bandwidth or latency. For example, one of a set of accelerators may be associated with a particular client or server based on the network bandwidth or latency between them.

Transaction accelerators 120 and 140 accelerate communications between client 110 and server 150 as described in McCanne I and McCanne III. As described in McCanne I and McCanne III, transaction accelerators 120 and 140 in operation may be considered to have both an outer channel and an inner channel. The outer channel comprises connections 112 and 142 between the client-side transaction accelerator 120 and the client 110 and between server-side transaction accelerator 140 and server 150, respectively. The inner channel includes connection between transaction accelerators 120 and 140 via WAN 130. In some applications, the client-side transaction accelerator 120 and server-side transaction accelerator 140 communicate via a secure or encrypted connection, such as those employed for Virtual Private Networks.

The transaction accelerators 120 and 140 arrange the outer channel connections and network traffic so that interactions between the client 110 and server 150 are identical, or substantially similar, to the interactions that would occur in the absence of the transaction accelerators 120 and 140. This characteristic of the outer channel is sometimes referred to as transparency. The existence and nature of the inner channel are typically hidden from both client 110 and server 150. Because the inner channel is typically unknown to client 110 or server 150, a variety of optimization and security mechanisms can be used on that inner channel to improve the quality, performance, and reliability of communications between client 110 and server 150 without affecting client 110 or server 150, and the specific optimization mechanisms in use at any point in time can be changed as needed.

At least some network traffic between client 110 and server 150 passes through, or is diverted to, accelerators 120 and 140. Network traffic received from client 110 by accelerator 120 is optimized for passage across the inner channel including WAN 130, by any of a variety of means as described in the cross-referenced applications. The optimized network traffic received by accelerator 140 is then de-optimized so as to be identical to, or an acceptable substitute for, the network traffic that was originally sent from client 110. This de-optimized network traffic is then sent on to server 150. Likewise, network traffic received from server 150 by accelerator 140 is optimized for passage across WAN 130. The optimized network traffic received by accelerator 120 is then de-optimized so as to be identical to, or an acceptable substitute for, the network traffic that was originally sent from server 150. This de-optimized network traffic is then sent on to client 110.

In system 100, the transaction accelerators 120 and 140 are connected in-path, so that all network traffic between client 110 and server 150 passes through these accelerators. In other arrangements of system 100, the transaction accelerators 120 and 140 are connected out of path. In an out-of-path deployment, all of the network traffic between client 110 and server 150 passes through routers, switches, or other networking devices. The routers, switches, or other networking devices are configured to divert some or all of the network traffic between the client 110 and the server 150 to one of the transaction accelerators 120 or 140. The diversion of network traffic to transaction accelerators may be facilitated with a redirection or caching protocol, such as the Web Cache Communication Protocol (WCCP).

Figure 2C:
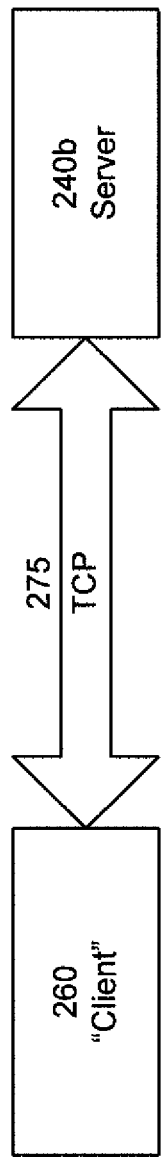

FIGS. 2A-2D illustrate the actual and apparent interactions of prior transaction accelerators in facilitating communications between clients and servers. FIG. 2A shows example elements and their connections for a single logical connection from client 210 to server 240a. In FIG. 2A, client 210a has a network connection 271 to client-side accelerator 220. Client-side accelerator 220 has a network connection 272 to server-side accelerator 230. Server-side accelerator 230 has a network connection 273 to server 240a. As shown in FIG. 2A, in some implementations, the client-side accelerator 220 is a hardware device connected with one or more clients via a network connection. In other implementations, the client-side accelerator 220 may be implemented as software and/or hardware integrated with the client 210a. In these implementations, the network connection 272 may be omitted.

FIG. 2B shows the apparent connections available to match the view from client and server. In FIG. 2B, client 210b has a Network connection 274 to "server" 250. That is, client 210b acts as though it has a connection to server 240b (logically connection 276 in FIG. 2D), but client 210b actually has connection 274 to client-side accelerator 220 acting as "server" 250. Similarly, in FIG. 2C server 240b has a network connection to "client" 260: server 240b acts as though it has a connection to client 210b (again, logically connection 276 in FIG. 2D), but server 240b actually has connection 275 to server-side accelerator 230 acting as "client" 260.

Figure 2D:
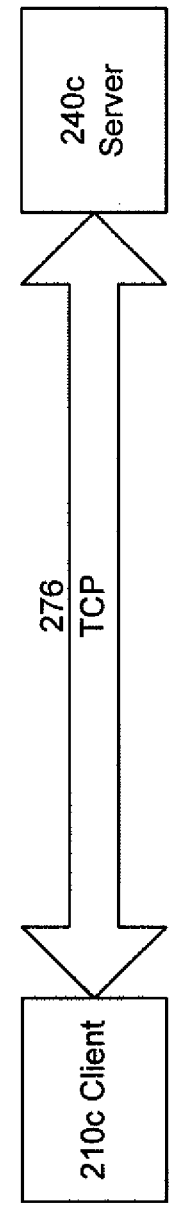

FIG. 2D shows the logical connection of client 210c is communicating with server 240c via Network connection 276, which results from the network connections of FIG. 2A.

As discussed above, clients and servers may wish to communicate via secure communication protocols to protect sensitive information. Even if the inner connection between transaction accelerators is secure, this connection is often invisible to clients and servers. Moreover, communications between clients and servers should still be secure when traveling through the outer connections. Thus, clients and servers will often attempt to establish a secure connection directly between each other. However, the use of secure communication protocols frustrates transaction acceleration, because cryptography (by design) renders encrypted data unintelligible and non-repeating.

An embodiment of the invention allows clients and servers to establish secure connections directly between each other while still enabling transaction acceleration. This embodiment ensures that communications between clients and servers are secure when traveling over both the inner and outer connections.

Figure 3A:
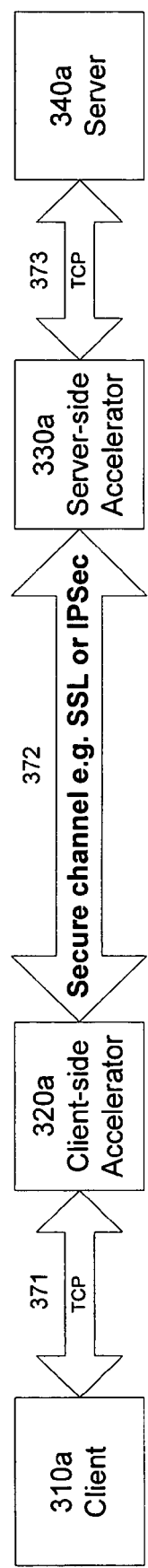
FIGS. 3A-3C shows the actual and apparent interactions of transaction accelerators in facilitating communications between clients and servers according to an embodiment of the invention.
Figure 3B:
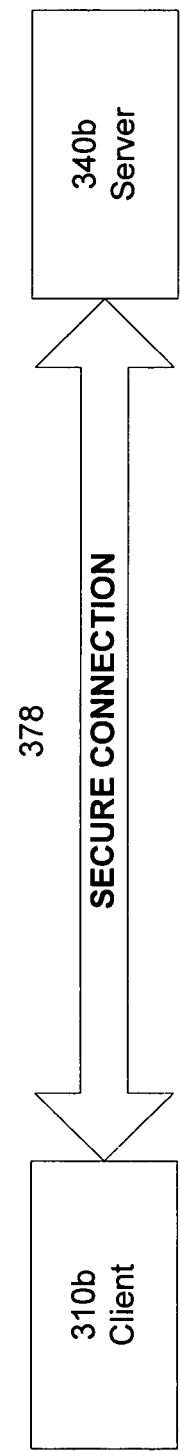
Figure 3C:
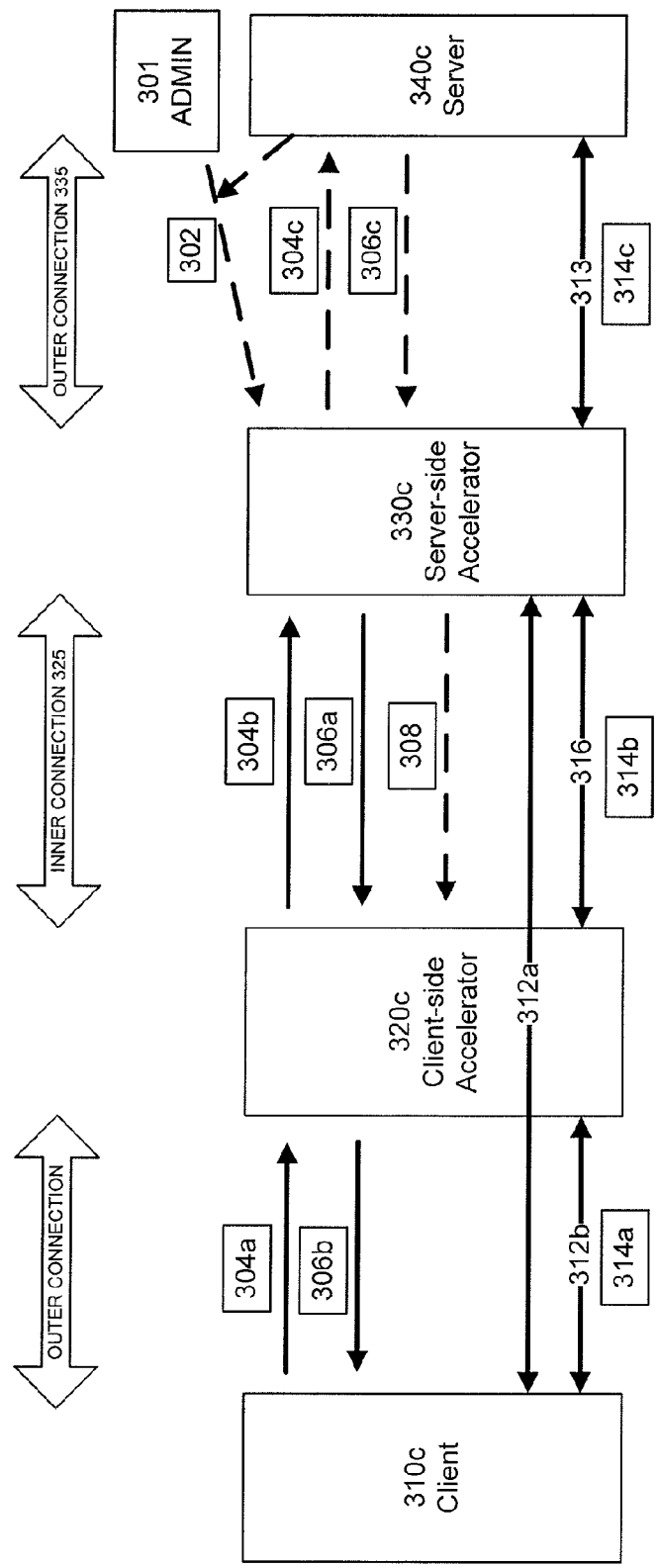

FIGS. 3A-3C show the actual and apparent interactions of transaction accelerators in facilitating communications between clients and servers according to an embodiment of the invention. In FIG. 3A, client 310a communicates with server 340a via network connection 371 to client-side accelerator 320a. Server 340a likewise communicates with client 310a via network connection 373 to server-side accelerator 330a.

Client-side accelerator 320a and server-side accelerator 330a communicate via secure channel 372, which may be based on SSL, IPSec, or any of a number of other secure communication mechanisms. The secure channel 372 may have been set up specifically for this communication between client 310a and server 340a, or it may be shared for a number of distinct communications between multiple clients and servers that pass through accelerators 320a and 330a. The termination of a secure channel 372 may likewise be related to or unrelated to the initiation or termination of particular connections to clients or servers. A secure channel 372 may reinitiate, rekey, or renegotiate its security parameters periodically, or as determined by a function of network, connection, or network traffic characteristics. The function prompting reinitiation, rekeying, or renegotiation may be deterministic, random, or pseudorandom in nature.

Clients and servers may attempt to establish a direct secure connection. FIG. 3B shows the logical effect to be achieved: client 310b communicates with server 340b over secure connection 378. The secure connection 378 may be used to initiate communications between the client 310b and server 340b. Alternatively, client 310b and server 340b can exchange information insecurely over an unsecure network connection, such as an unsecure TCP connection, prior to establishing secure connection 378.

However the secure connection 378 is established, for the transaction accelerators to be able to accelerate the SSL network traffic across the WAN, the transaction accelerators must be able to decrypt the network traffic on each side. In embodiments discussed below, security information, such as encryption keys and digital certificates, are provided to the transaction accelerators to allow the complete spoofing and termination of the secure connection 378 by the transaction accelerators. As a result, the secure connection 378 established by clients and servers is used for all or a portion of the outer connection to the transaction accelerators.

FIG. 3C illustrates the initiation and operation of a secure connection according to an embodiment of the invention. Server-side transaction accelerator 330c receives security information 302, such as encryption keys and digital certificates, from a server 340c or administrative system 301. Security information 302 is sufficient for transaction accelerator 330c to assume the identity of server 340c and optionally additional servers. In embodiments, server 340c can provide all or a portion of security information 302 directly to server-side transaction accelerator 330c or another computer system can provide security information 302 to server-side transaction accelerator 330c for server 340c.

Client 310c sends a secure connection request 304a to server 340c via client-side transaction accelerator 320c. Client-side transaction accelerator 320c intercepts secure connection request 304a and in turn forwards the secure connection request 304b to server-side transaction accelerator 330c. In an embodiment, client-side transaction accelerator 320c acts as a bridging device for this forwarding, so that request 304b is similar or identical to 304a.

Because the server-side transaction accelerator 330c has security information sufficient to assume the identity of server 340c, server-side transaction accelerator 330c will respond to secure connection request 304b with a secure connection response 306a. Client-side transaction accelerator 320c will intercept the secure connection response 306a and forward secure connection response 306b to client 310c, thereby establishing a secure connection 312a between client 310c and server-side transaction accelerator 330c. Any information sent via this secure connection 312a will be unintelligible to any intervening components, including client-side transaction accelerator 320c. In an embodiment, client-side transaction accelerator 320c acts as a bridging device for this forwarding, so that request 306b is similar or identical to 306a.

In an embodiment, server-side transaction accelerator 330c will optionally also exchange messages 304c and 306c with the server 340c to establish a second secure connection 313 between server-side transaction accelerator 330c and server 340c. This optional second secure connection 313 will encrypt communications between server-side transaction accelerator 330c and server 340c via outer connection 335. This optional second secure connection 313 may be omitted if the network connecting server-side transaction accelerator 330c and server 340c is considered to be secure. In a further embodiment, if the communication between server-side transaction accelerator 330c and server 340c is encrypted, some form of connection reuse may be employed so as to ensure that the server is not required to initiate or terminate secure connection 313 for each incoming client connection.

In some embodiments, the security protocol of the secure connection 312a, for example SSL, may require a series of messages similar to messages 304 and 306 exchanged between client 310c and server-side transaction accelerator 330c to establish the secure connection. For some security protocols, such as SSL, messages 304 and 306 use public-key cryptography to establish the secure connection 312a. Public-key cryptography is used to share a symmetric key between the client 310c and the server-side transaction accelerator 330c. Once the secure connection 312a is operational, the symmetric key will be used by both sides of the secure connection 312a to encrypt and decrypt information.

During the initiating of the secure connection 312a and the exchange of the symmetric key, the symmetric key as well as any other encrypted information in messages 304 and 306 is unreadable by the client-side transaction accelerator 320c. As discussed in detail below, the symmetric key and other secure connection information will be provided to the client-side transaction accelerator 320c, enabling the transaction accelerators 320c and 330c to optimize secure network traffic over the inner connection 325.

In an embodiment, client-side transaction accelerator 320c chooses the symmetric-key cipher suite and communicates it to server-side transaction accelerator 330c, which in turn uses this cipher suite in message 306 to establish the secure connection 312a with the client 310c. The client-side transaction accelerator 320c saves this cipher suite for later use.

In another embodiment, server-side transaction accelerator 330c chooses the symmetric-key cipher suite and uses this cipher suite in message 306 to establish the secure connection 312a with the client 310c. This cipher suite is communicated from the server-side transaction accelerator 330c to the client-side transaction accelerator 320c via a secure connection 316. For example, secure connection 316 may be one of an arbitrary number of previously established secure connections used for commands and control data between the server-side transaction accelerator 330c and the client-side transaction accelerator 320c or for optimized network traffic associated with one or more clients and/or servers. In some embodiments, the server-side transaction accelerator 330c may pass the entire symmetric-key negotiation to the client-side transaction accelerator 320c if the public-key information is known by client-side transaction accelerator 330c.

Following the establishment of the secure connection 312a between the client 310c and server-side transaction accelerator 330c, an embodiment of server-side transaction accelerator 330c forwards secure connection information 308 to client-side transaction accelerator 320c. Secure connection information 308 enables client-side transaction accelerator 320c to take over the secure connection 312a in place of server-side transaction accelerator 330c. As a result, secure connection 312a, between the client 310c and the server-side transaction accelerator 330c, is transformed into secure connection 312b, between the client 310c and the server-side transaction accelerator 330c.

The secure connection information 308 can include information such as a symmetric key or other type of cryptographic information necessary to decrypt secure connection network traffic from the client 310c and to respond appropriately via the established secure connection. In an embodiment, secure connection information 308 is not needed if the client-side transaction accelerator 320c already has sufficient information to decrypt and encrypt network traffic on the secure connection.

After secure connection information 308 has been received by the client-side transaction accelerator 320c, network traffic between the client 310c and the server 340c communicated via the secure connection 312b can be intercepted, analyzed, and optimized by the transaction accelerators 320c and 330c. The client 310c sends network traffic 314a to the server 340c via the newly established secure connection 312b. As secure connection 312b terminates at the client-side transaction accelerator 320c, the client-side transaction accelerator 320c intercepts, decrypts, and processes network traffic 314a to form network traffic 314b. Network traffic 314b may be optimized for communication over inner connection 325.

Client-side transaction accelerator 320c communicates network traffic 314b with the server-side transaction accelerator 330c. In an embodiment, network traffic 314b is communicated via secure connection 316. As discussed above, the secure connection 316 may have been previously established to carry optimized network traffic between transaction accelerators 320c and 330c, or may have been previously established to carry control messages and cryptographic information between transaction accelerators 320c and 330c. Secure connections for carrying optimized network traffic may also be created dynamically, corresponding to client/server connection initiation.

In an embodiment, accelerators 320c and 330c can terminate secure connections between multiple clients and/or servers. In these applications, the accelerators 320c and 330c may share secure connections 312b, 313, and 316 in a number of ways. In one example, client-side and server-side accelerators 320c and 330c can maintain separate outer channel secure connections for each client and server. In another embodiment, the client-side and server-side accelerators 320c and 330c can utilize an outer channel secure connection to carry data associated with multiple connections with clients and/or servers.

Embodiments of the client-side and server-side accelerators 320c and 330c can utilize separate inner channel secure connections for each pair of client-server communications. Alternatively, embodiments of the client-side and server-side accelerators 320c and 330c can utilize an inner channel secure connection 316 to carry data associated with multiple clients and/or servers. In this embodiment, the inner-channel secure connection 316 may be renewed frequently to maintain security. For example, the inner channel secure connection 316 may be renewed after a specified time period or a carrying data for a specified number of client-server outer channel connections. In a further embodiment, the accelerators 320c and 330c maintain a pool of available inner channel secure connections, each for use in carrying data associated with one or more pairs of client-server outer channel secure connections.

Server-side transaction accelerator 330c receives optimized network traffic 314b and transforms it into de-optimized network traffic 314c. The de-optimized network traffic 314c may be identical to, or an acceptable substitute for, the network traffic 314a that was originally sent from client 310c. Server-side transaction accelerator 330c communicates the de-optimized network traffic 314c with the server 340c. In an embodiment, network traffic 314c is carried via secure connection 313 to the server 340c. In another embodiment, network traffic 314c is carried via an insecure connection to server 340c.

Return network traffic (from server 340c to client 310c) takes a similar but reversed path. The server-side transaction accelerator 330c receives network traffic from the server 340c. This network traffic is optimized and sent across the inner connection 325 via the secure connection 316 to client-side transaction accelerator 320c. Client-side transaction accelerator 320c de-optimizes the received network traffic and applies the appropriate encryption to the de-optimized network traffic before sending it via secure connection 312b to client 310c.

In an embodiment, if the client 310c attempts to renegotiate the secure connection 312b, the secure connection 312b will terminate and be reestablished as described above. In another embodiment, if the client 310c attempts to renegotiate the secure connection 312b, the secure connection 312b will be converted back to the form of secure connection 312a and the server-side transaction accelerator 330c will perform the server side of renegotiation. In that embodiment, a successful renegotiation will again cause server-side accelerator 330c to send secure communication information 308 to client-side accelerator 320c, allowing secure connection 312a to be converted back to the form of secure connection 312b.

In an embodiment, if the server-side transaction accelerator 330c cannot terminate the secure connection with client 310c, for example because it does not have the relevant key and/or certificate, then the network traffic is passed through to the appropriate server, such as server 340c. Subsequent network traffic associated with this secure connection is also copied through by the transaction accelerators 320c and 330c. In an additional embodiment, this "negative" information indicating that a secure connection cannot be terminated is passed to client-side transaction accelerator 320c so that subsequent similar network connections, such as those requiring the same keys, automatically bypass the transaction accelerators 320c and 330c. The negative information cache may be partially or totally invalidated by a signal from the server-side transaction accelerator that its key configuration has been changed, so that transaction accelerators do not continue to bypass connections that they could terminate.

In an embodiment, the security protocol, cipher suite, and/or security algorithm of secure connection 316 is different from that used for secure connection 312b. This capability allows transaction accelerators 320c and 330c to terminate secure connections from an old or security-deficient client 310c that supports only weak cipher suites, but then actually carry the network traffic across the inner channel 325 and wide-area network using a stronger form of encryption.

In another embodiment, the server-side transaction accelerator 330c does not terminate the secure connection 312, but instead passes secure connection requests 304 to the server 340c. In this embodiment, the server-side transaction accelerator 330c still needs the server private key to be able to read server-encrypted information, but does not need to present a digital certificate to assume the identity of the server 304c. Instead, the server-side transaction accelerator 330c monitors the secure communication protocols interaction and informs the client-side transaction accelerator of the symmetric key negotiated. This mode is useful for accelerating existing secure communication protocols-offload infrastructure and may be useful for accelerating secure communication protocols for virtual private networking (VPNs). In this embodiment, the server-side transaction accelerator presents reconstituted data to the server encrypted with the same symmetric key as that used by the client, because the server believes that it is the only entity terminating the secure connection. However, the communication between client-side and server-side transaction accelerators can also use the same key or an entirely different key and/or encryption technique for protecting the transfer of optimized data.

In an embodiment, the transaction accelerators 320c and 330c employ self-signed certificates. In this embodiment, self-signed certificates and procedures are used to establish secure connections, such as secure connection 316. In this embodiment, these associations between transaction accelerators are not spontaneously set up between pairs of devices; instead they are explicitly configured by system administrators for client-side and server-side transaction accelerators.

In this embodiment, a transaction accelerator or a central management console can present an administrator with a list of devices that present self-signed certificates and names, IP addresses and/or other identifying information. Administrators can choose whether to accept or reject each device separately. By default, no association is created unless specified by an administrator.

The external trusted certificate authority normally used to sign certificates is typically required when attempting to authenticate an identity with no other clues, such as when an arbitrary web browser contacts an arbitrary web server. In an embodiment, self-signed certificates, which do not rely on an external trusted certificate authority, can be used when there are other clues to assist in authenticating identities of transaction accelerators, such as the administrator's knowledge of the organizational context. The administrator's choice is informed by the non-computational organizational context, such as "Are we trying to bring some device online? What is that device's IP address? Is there any legitimate reason for there to be a device presenting a new certificate now?"

In general, devices at the edges of organizations are less well defended and more easily attacked than those in the core (such as in a data center). It is worth considering what consequences follow from an attack on such an edge device. An attacker might get the private key corresponding to the transaction accelerator's certificate (whether self-signed or externally signed), thereby subverting the transaction accelerator by gaining access to its secure channels used for communication with other transaction accelerators. For the time period that the transaction accelerator is subverted, such an attacker is able to carry out all the same attacks as if the attacker had access to all the server private keys. However, the server private keys themselves are never made available to the attacker, even when such subversion takes place. By regaining control of the transaction accelerator and rekeying it, the potential for attack is ended. Rekeying a single compromised transaction accelerator is much less disruptive than rekeying a widely-used server, and this advantage increases when considering multiple such widely-used servers.

The above-described secure connection termination schemes have several advantages, including:
  No server keys or certificates are required at the client-side transaction accelerator; only short-lived symmetric keys that are changed for each secure connection.
  Securing of client-side transaction accelerator/server-side transaction accelerator network traffic can be done via self-signed certificates and procedures
  Cryptography performed by the client-side transaction accelerator is relatively cheap symmetric encryption, not more expensive public-key encryption.
  Architecturally similar to other types of transaction accelerator functionality, in which all transactions should be logically sent to server.

Figure 4:
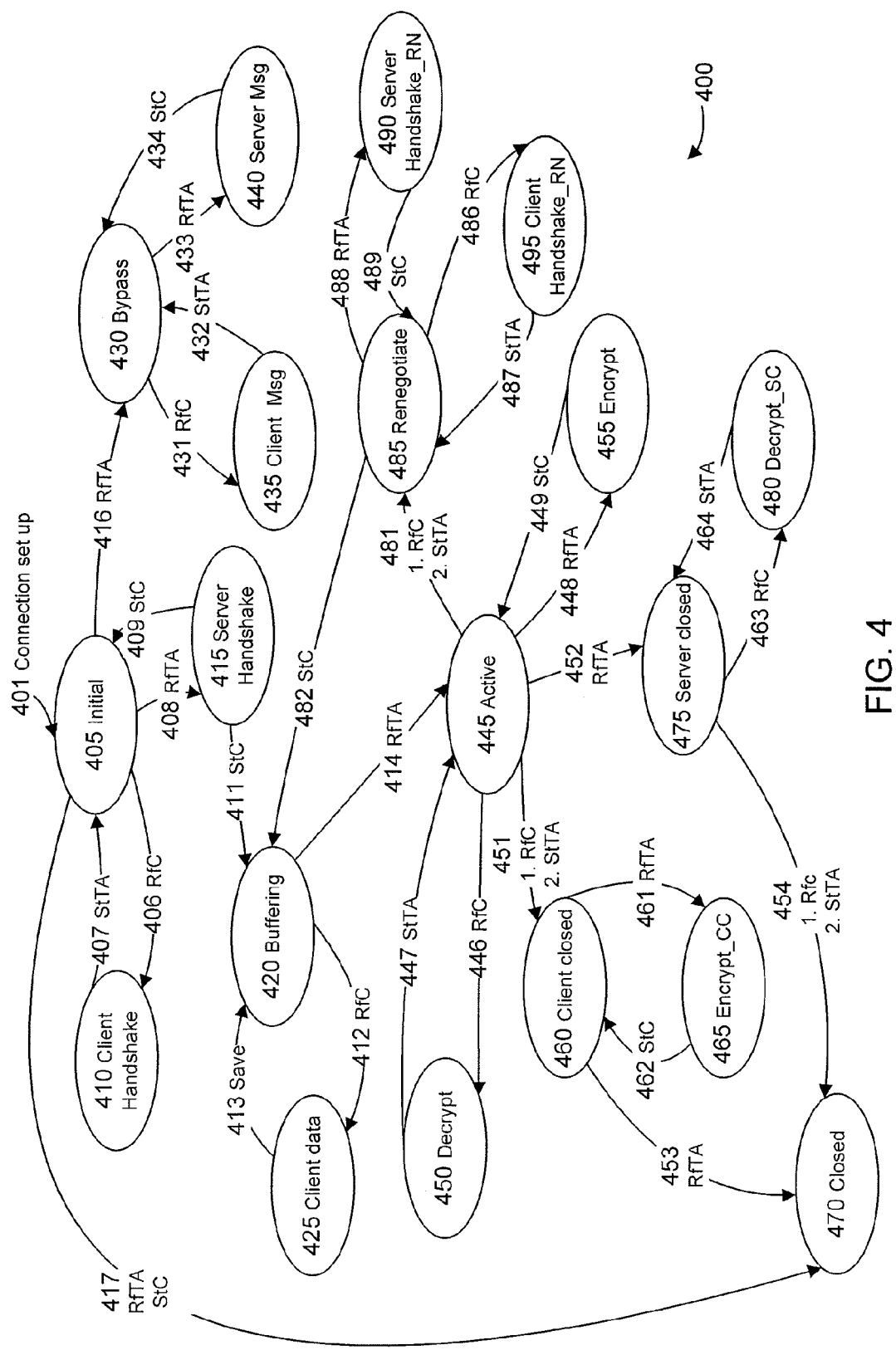
FIG. 4 shows a state diagram for the client-side accelerator using SSL according to an embodiment of the invention.

FIG. 4 shows a state diagram 400 for the client-side accelerator using the SSL secure connection protocol according to an embodiment of the invention. It will be apparent to one skilled in the arts that a similar state diagram could be likewise constructed for a different protocol with a similar public-key/symmetric-key split. It will be similarly apparent to one skilled in the arts that the diagram is arranged for easy comprehension, and that many minor rearrangements of states and transitions could be made without significantly altering the essence of how the client-side transaction accelerator works. Accordingly, the diagram should be understood as illustrating general principles of operation. In the diagram, the following abbreviations are used for various message interactions:

"RfC" is "Receive from Client."
"RfTA" is "Receive from (server-side) Transaction Accelerator."
"StC" is "Send to Client."
"StTA" is "Send to (server-side) Transaction Accelerator."
In addition, the abbreviation "HIS" is used for "handshake".

The Initial state 405 is entered when the initial network connection configuration is set up 401. The first way out of the Initial state 405 is when the server-side transaction accelerator decides that this connection should be bypassed (i.e. not terminated by the transaction accelerators). The message 416 moves the system into the Bypass state 430. The Bypass state 430 has simple behavior in which any message 433 received from the server-side transaction accelerator (is sent to the client as message 434 and any message 431 received from the client is immediately sent to the server-side transaction accelerator as message 432. The Client Msg state 435 and Server Msg state 440 are indicated for consistency with the rest of the diagram, but in an embodiment these states will be very lightweight, zero-cost, or nonexistent in the implementation.

Additional state transitions from the Initial state 405 are related to the SSL handshake. In an embodiment, the client-side transaction accelerator does not participate in the handshake since termination of the secure connection handshake takes place at the server-side transaction accelerator. Accordingly, the actions relating to Initial state 405 primarily amount to watching the handshake network traffic pass by. On receiving a handshake message 406 from the client, the system moves to the Client Handshake state 410, then sends the same handshake message 407 to the server-side transaction accelerator and returns to Initial state 405. Likewise, on receiving a handshake message 408 from the server-side transaction accelerator, the system moves to the Server Handshake state 415, then sends the same handshake message 409 to the client and returns to Initial state 405.

In an embodiment, the client-side transaction accelerator can also exit Initial State 405 on the receipt of a Shutdown message from the server-side transaction accelerator, which occurs when the server has refused the connection. On receipt of this message 417 the system moves to the Closed state 470.

The system transitions from Server Handshake state 415 to Buffering state 420 when sending the last handshake message 411 from the server. In an embodiment, the last handshake message is identifiable as a static property of the protocol in use; however, alternative embodiments are possible in which the last handshake message is identified by a count of messages exchanged, one or more bits set to indicate the end of the handshake, or an external trigger such as an external event occurring, or reaching a designated state of an entirely different protocol.

On entering the Buffering state 420, the client-side transaction accelerator saves any client messages received via the secure connection until the cipher suite information is received from the server-side transaction accelerator. While waiting for the cipher suite, each client message received 412 is simply saved 413 for subsequent decryption and acceleration. On receiving the cipher suite or other information sufficient to terminate the secure connection 414, the client-side transaction accelerator moves into the Active state 445.

In the Active state 445, having received the cipher suite information, the client-side transaction accelerator is able to decrypt messages received from the client and encrypt messages sent to the client. Accordingly, each message 446 received from the client is handled by moving to the Decrypt state 450, which in turn decrypts the message 446 and sends an optimized message 447 to the server-side transaction accelerator. Each optimized message 448 received from the server-side transaction accelerator is de-optimized and then handled by the Encrypt state 455, which in turn sends the encrypted message 449 to the client via the secure connection. As discussed above, the client-side and server-side transaction accelerators optimize network traffic for communication over the inner connection.

Additional states associated with the Active state 445 are related to closing the secure connection or to renegotiation of the secure connection. If the client closes the connection to the client-side transaction accelerator, the client-side transaction accelerator notices that close and sends a "client closed" message 451 to the server-side transaction accelerator and moves to the Client Closed state 460. In this state, the client-side transaction accelerator encrypts any remaining data 461 from the server via the server-side transaction accelerator in Encrypt_CC state 465, sends the encrypted messages 462 to the client, and returns to Client Closed state 460.

In an embodiment, such encryption is not performed if the underlying reason for the closed connection is known to be an abrupt failure that has broken the connection; instead, the data received is discarded since there is no way to send it to the client.

Likewise, if the server closes the connection to the server-side transaction accelerator, the client-side connection accelerator receives a "server closed" message 452 from the server-side transaction accelerator and moves to the Server Closed state 475. In this state 475, the client-side transaction accelerator decrypts and optimizes any remaining data 463 received from the client in Decrypt_SC state 480, sends the optimized messages 464 to the server-side transaction accelerator, and returns to Server Closed state 475.

In an embodiment, such decryption is not performed if the underlying reason for the closed connection is known to be an abrupt failure that has broken the connection; instead, the data received is discarded since there is no way to send it to the server.

From either the Client Closed state 460 or the Server Closed state 475, the client-side transaction accelerator transitions to the Closed state 470. From the Client Closed state 460 this transition occurs on receiving a "server closed" message 453 from the server-side transaction accelerator. Correspondingly, from the Server Closed state 475 this transition occurs on noticing the client close and sending a "client closed" message 454 to the server-side transaction accelerator.

Turning to renegotiation of the secure connection, if the message received from the client is a secure connection request or other type of "Hello" message requesting a new secure connection, then the client-side transaction accelerator starts a new secure connection negotiation. The client-side transaction accelerator sends a "Session Dump" message 481 to the server-side accelerator, signaling that the termination for the connection should move back to the server-side accelerator.

The errors that can occur during renegotiation are similar to those that can occur during initial negotiation; it will be apparent to one skilled in the arts that those errors can be handled with similar states and transitions to the ones already explained (such as states 485, 490, 495 and transitions 482, 486, 487, 488, 489). In some embodiments, it may be possible and desirable for a renegotiation to reuse states and transitions already presented as useful for initial connection setup and negotiation. In other embodiments, it may be preferable for renegotiation to cause the connection to be bypassed (moving to Bypass state 430 or a different state with similar behavior) or for the connection to be broken (forcibly moving into one of the states where the connection is closing or closed).

Figure 5:
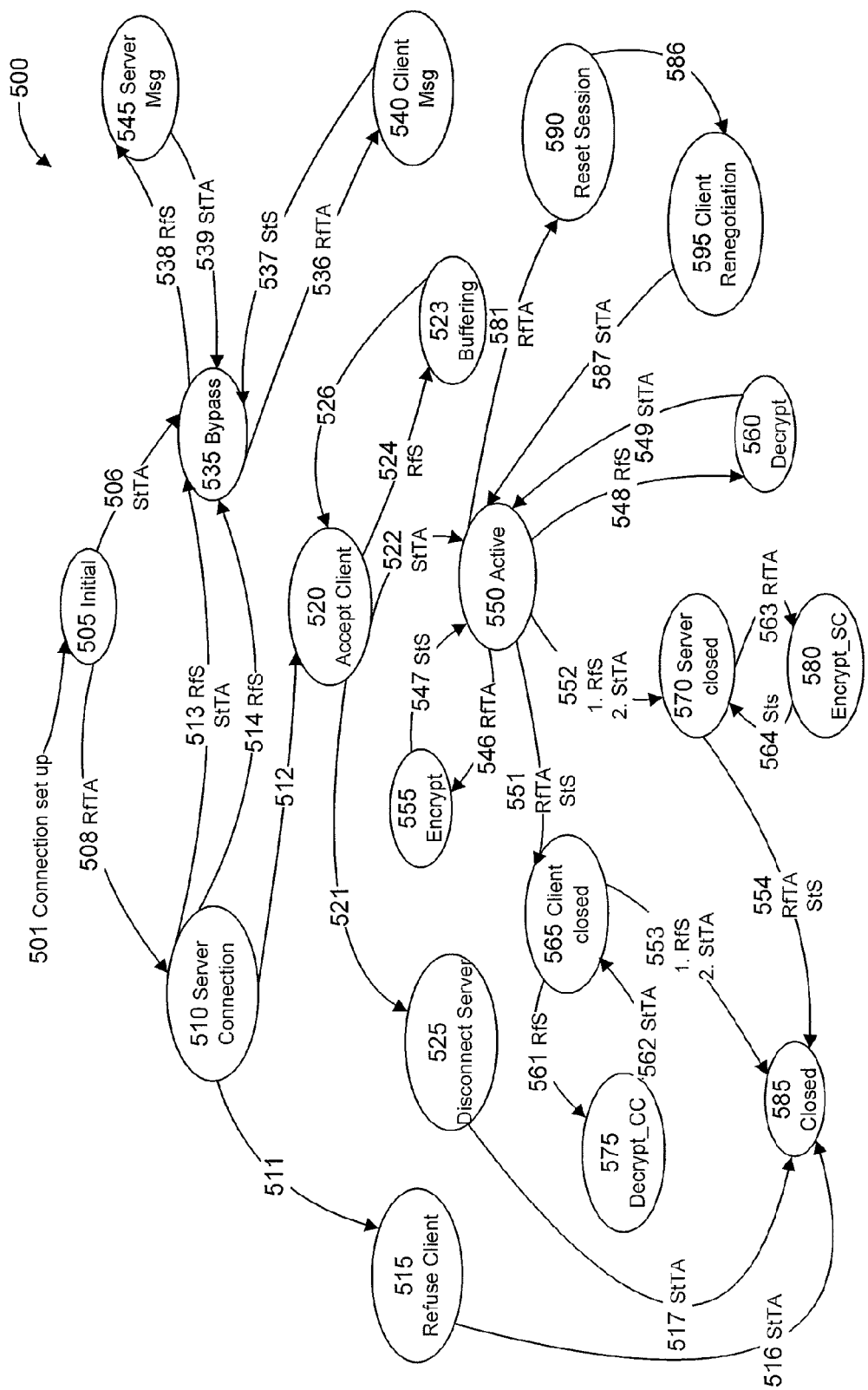
FIG. 5 shows a state diagram for the server-side accelerator using SSL according to an embodiment of the invention.

FIG. 5 shows a state diagram 500 for the server-side accelerator using the SSL secure connection protocol according to an embodiment of the invention. It will be apparent to one skilled in the arts that a similar state diagram could be likewise constructed for a different protocol with a similar public-key/symmetric-key split. It will be similarly apparent to one skilled in the arts that the diagram is arranged for easy comprehension, and that many minor rearrangements of states and transitions could be made without significantly altering the essence of how the server-side transaction accelerator works. Accordingly, the diagram should be understood as illustrating general principles of operation. In the diagram, the following abbreviations are used for various message interactions:

"RfS" is "Receive from Server."
"RfTA" is "Receive from (client-side) Transaction Accelerator."
"StS" is "Send to Server."
"StTA" is "Send to (client-side) Transaction Accelerator."

The Initial state 505 is entered when the initial network connection configuration is set up 501. The server-side transaction accelerator may exit Initial state 505 when one of a number of conditions occurs prompting the server-side transaction accelerator to decide that this connection should be bypassed (not terminated). One condition is that the server to be contacted is one for which the server-side transaction accelerator has no relevant keys or certificates, and therefore the server-side transaction accelerator is unable to terminate the connection for that server. Another condition is that the client is attempting to use a protocol or version that is unsupported by the server-side transaction accelerator, even though the server-side transaction accelerator would be able to terminate a connection to that server if the client were using a different protocol or version. In the case of either condition, the server-side transaction accelerator sends a "Bypass" message 506 to the client-side transaction accelerator and the system moves into the Bypass state 535.

The Bypass state 535 has simple behavior in which any message 538 received from the server is forwarded as message 539 to the client-side transaction accelerator, and any message received 536 from the client-side transaction accelerator is forwarded as message 537 to the server. The Client Msg state 540 and Server Msg state 545 are indicated for consistency with the rest of the diagram, but in an embodiment will be very lightweight, zero-cost, or nonexistent in the implementation.

Another exit from the Initial state 505 occurs when the client sends a secure connection request message 508 to initiate a secure connection and the server-side transaction accelerator has the necessary information to terminate the secure connection. The server-side transaction accelerator moves to the Server Connection state 510. The underlying principle of Server Connection state 510 is to accept a client's connection request only when the server accepts the server-side transaction accelerator's corresponding connection request.

In Server Connection state 510, the server-side transaction accelerator attempts to connect to the server. In an embodiment, the relevant secure connection handshake messages with the server are dealt with in this state 510. The server-side transaction accelerator transitions out of Server Connection state 510 either on a successful or unsuccessful initiation of the secure connection with the server.

Upon failure to initiate a secure connection with the server 511, the server-side transaction accelerator rejects the pending client's request and moves to the Refuse Client state 515. From this state 515, the server-side transaction accelerator sends Shutdown message 516 to the client-side transaction accelerator to indicate that the server has refused the secure connection and moves to the Closed state 585.

Conversely, if the attempt to initiate a secure connection with the server is successful, the server-side transaction accelerator moves via transition 512 to the Accept Client state 520 to complete the secure connection with the client. In an embodiment, just as the Server Connection state 510 dealt with several handshake message exchanges with the server, Accept Client state 520 may deal with several handshake message exchanges with the client to initiate the secure connection.

The example state diagram 500 shows state 510 completed and the server connection established before the transaction accelerator transitions to state 520, corresponding with an embodiment suitable for some secure connection protocols. However, other embodiments may interleave the server handshake and client handshake. For example, the server-side transaction accelerator could accept the secure connection request from the client prior to the establishment of a corresponding secure connection between the server-side transaction accelerator and the server, and then later terminate this secure connection with the client if the server rejects the secure connection with the server-side transaction accelerator.

While the server-side transaction accelerator is still in the Accept Client state 520, an aggressive server may begin sending data immediately—before the client connection is established. In an embodiment, any such data received from the server is buffered for subsequent processing when the client connection has been established, as indicated by the Buffering state 523. Buffering state 523 is entered by transition 524 indicating the receipt of any information from the server. Buffering state 523 is exited (back to Accept Client state 520) by transition 526 indicating the saving of the received information.

If the secure connection initiation process with the client fails, transition 521 the server-side transaction accelerator moves to Disconnect Server state 525 to gracefully disconnect its established connection with the server. From Disconnect Server state 525, the server-side transaction accelerator sends a Shutdown message 517 to the client-side transaction accelerator and moves to the Closed state 585.

In an embodiment, the server-side transaction accelerator may transition from Server Connection state 510 to Bypass state 535 under two conditions. The server can demand client authentication 513 from the server-side transaction accelerator. The server-side transaction accelerator has keys and certificates for the server, but no similar keys and certificates for any client; so a demand for client authentication requires that the actual client's credentials be presented to the server, which in turn will lead to the negotiation of a session that is opaque to the transaction accelerators. Also, the server can indicate 514 that it will reuse an existing session for the client. If that reused connection depends on information unknown to the server-side transaction accelerator, the server-side transaction accelerator again chooses to bypass the connection.

It will be apparent to one skilled in the arts that the bypass situation of transition 513 can be readily avoided in special cases where it is acceptable to store keys and certificates for particular clients at the server-side transaction accelerator. However, it will also be apparent that such storage of client keys and certificates at the server-side transaction accelerator effectively undermines the soundness of client authentication for the clients whose keys and certificates are stored. The storage of client keys and certificates may be valuable in particular instances, but as a general approach it would mean that the client authentication step is meaningless. Accordingly, a more efficient implementation of the same effect would simply drop the demand for client authentication.

In the case where the server-side transaction accelerator has successfully initiated the secure connection with the client and sets up the connection to the server, the server-side transaction accelerator sends a Session Context message 522 to the client-side transaction accelerator including the relevant cipher suite information, allowing the client-side transaction accelerator to encrypt and decrypt information to/from the client. The server-side transaction accelerator then moves into the Active state 550.

In the Active state 550, both client and server secure connections have been set up. The client-side transaction accelerator has become the termination point for the client's secure connection, performing bulk encryption/decryption of data to/from the client. When the server-side transaction accelerator is in the Active state 550, each optimized message 546 received from the client-side transaction accelerator is handled by moving to the Encrypt state 555, which de-optimizes, encrypts, and sends the encrypted message 547 to the server. Each message 548 received by the server-side transaction accelerator from the server is handled by moving to the Decrypt state 560, which decrypts, optimizes, and sends the optimized message 549 to the client-side transaction accelerator. If data was buffered using the Buffering state 523 prior to entering the Active state 550, the buffered data is sent to the client using the Decrypt state 560 and sent to the client-side transaction accelerator, prior to handling any other messages received from the server.

Additional states associated with the Active state 550 are related to closing or renegotiating the secure connection. If the client closes the connection to the client-side transaction accelerator, the client-side transaction accelerator notices that close and sends a "client closed" message 551 to the server-side transaction accelerator, which in turn sends a "close" message to the server and moves to the Client Closed state 565. In that state, the server-side transaction accelerator decrypts any remaining data 561 received from the server in Decrypt_CC state 575, sends the decrypted data 562 to the client-side transaction accelerator, and returns to Client Closed state 565. In an embodiment, such decryption is not performed if the underlying reason for the closed connection is known to be an abrupt failure that has broken the connection; instead, the data received is discarded since there is no way to send it to the client-side transaction accelerator.

Likewise, if the server closes the connection to the server-side transaction accelerator, the server-side connection accelerator notices that close and sends a "server closed" message 552 to the client-side connection accelerator which in turn moves to the Server Closed state 570. In that state, the server-side transaction accelerator encrypts any remaining data received from the client-side transaction accelerator (563) in Encrypt_SC state 580, sends the encrypted data 564 to the server, and returns to Server Closed state 570. In an embodiment, such encryption is not performed if the underlying reason for the closed connection is known to be an abrupt failure that has broken the connection; instead, the data received is discarded since there is no way to send it to the server.

From either the Client Closed state 565 or the Server Closed state 570, the server-side transaction accelerator can transition to the Closed state 585. From the Client Closed state 565, the server-side transaction accelerator notices the close by the server and sends a "server closed" message 553 to the client-side transaction accelerator. Correspondingly, from the Server Closed state 570, the server-side transaction accelerator receives the "client closed" message from the client-side transaction accelerator and sends a "close" message 554 to the server.

Turning to renegotiation of the secure connection, if the client-side transaction accelerator sends a "Session Dump" message 581 to the server-side transaction accelerator, this message 581 signals that the termination for the secure connection should move back to the server-side. The server-side transaction accelerator moves into the Reset Session state 590. Various secure connection request and response messages 586 may be exchanged between client and server-side transaction accelerator before the server-side transaction accelerator transitions to Client Renegotiation state 595. The server-side transaction accelerator will then determine whether it can renegotiate the secure connection based on policy, configuration, capacity of the system, availability of at least one relevant key, and/or length of connection prior to renegotiation.

After the server-side transaction accelerator sends a "Session Dump" message 587 to the client-side transaction accelerator, the termination for the secure connection moves back to the client-side transaction accelerator and the server-side transaction accelerator re-enters the Active state 550.

The errors that can occur during renegotiation are similar to those that can occur during initial negotiation; it will be apparent to one skilled in the arts that those errors can be handled with similar states and transitions to the ones already explained. In some embodiments, it may be possible and desirable for a renegotiation to reuse states and transitions already presented as useful for initial connection setup and negotiation. In other embodiments, it may be preferable for renegotiation to cause the connection to be bypassed (moving to Bypass state 535 or a different state with similar behavior) or for the connection to be broken (forcibly moving into one of the states where the connection is closing or closed).

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of initiating a secure connection, the method comprising:
  intercepting a secure connection request from a client requesting a connection to a server, the intercepting using an intercepting entity distinct from the server;
  initiating a secure connection with the client at the intercepting entity, wherein the secure connection is associated with at least one attribute enabling a secure communication of data via the secure connection while having access to data sent via the secure connection, wherein initiating a secure connection with the client comprises:
   a) observing with the intercepting entity the initiation of a secure connection between the client and the server;
   b) determining the attribute of the secure connection from the initiation of the secure connection; and
   c) receiving an indication that the initiation of the secure connection between the client and the server is complete; and
  forwarding the attribute from the intercepting entity to a network device distinct from the intercepting entity and in a path of the secure connection between the client and the intercepting entity such that the network device can use at least the attribute to maintain the secure connection with the client, the secure connection having been initiated with the intercepting entity, while having access to data sent via the secure connection.

2. The method of claim 1, wherein the secure connection request initiates a connection between the client and the server.

3. The method of claim 1, wherein the secure connection request initiates security for a previously-established connection between the client and the server.

4. The method of claim 1, wherein intercepting the secure connection request from the client comprises:
receiving a secure connection request previously intercepted by a second intercepting entity in-path with the client and redirected to the intercepting entity.

5. The method of claim 4, wherein receiving the secure connection request comprises:
receiving the secure connection request via a caching protocol.

6. The method of claim 1, wherein intercepting the secure connection request from the client comprises:
intercepting the secure connection request from the client via an in-path network connection with the client.

7. The method of claim 1, wherein observing the initiation of the secure connection is facilitated by receiving, by the intercepting entity, security information associated with the server.

8. The method of claim 1, wherein initiating the secure connection comprises:
initiating a first secure connection between the intercepting entity and the server; and
initiating a second secure connection between the intercepting entity and the client.

9. The method of claim 8, wherein the initiation of the first secure connection is completed before initiating the second secure connection.

10. The method of claim 8, wherein the second secure connection is initiated before the initiation of the first secure connection is completed.

11. The method of claim 1, wherein the attribute includes a cipher to be used to encrypt data for the secure connection.

12. The method of claim 1, wherein the network device receiving the forwarded attribute is closer on a network to the client than the intercepting entity.

13. The method of claim 12, wherein proximity of the network device and the intercepting entity to the client on the network is determined by network characteristics.

14. The method of claim 13, wherein the network characteristics include network latencies of the network from the network device and the intercepting entity to the client.

15. The method of claim 13, wherein the network characteristics include network bandwidths of the network from the network device and the intercepting entity to the client.

16. The method of claim 13, wherein the network device receiving the forwarded attribute is separated from the client by a first network including a local area network and wherein the intercepting entity is separated from the client by a second network including a wide area network.

17. The method of claim 13, wherein the network device receiving the forwarded attribute is integrated with a computer system including the client.

18. The method of claim 1, further comprising:
intercepting data from the server directed to the client;
communicating at least a portion of the data to the network device in association with an indicator, such that the network device will further communicate the portion of the data with the client via the secure connection.

19. The method of claim 1, further comprising:
receiving first data from the network device, wherein the first data corresponds with second data previously received by the network device from the client via the secure connection; and
communicating third data to the server, wherein the third data corresponds with the first data.

20. The method of claim 1, wherein forwarding the attribute to the network device includes:
initiating an additional secure connection with the network device; and
communicating the attribute via the additional secure connection.

21. A method of communicating securely with a client, the method comprising:
intercepting a secure connection request from a client to a server at a first network device;
initiating a first secure connection between the first network device and the client in response to the secure connection request; and
in response to the initiation of the first secure connection being successfully completed:
communicating an indicator from the first network device to a second network device that is in a network path between the client and the first network device, wherein the indicator is both an indicator that the first secure connection has been established between the client and the first network device and the indicator is also useable by the second network device to access and process secure communications that occur between the client and the first network device; and
assuming control of the first secure connection with the client at the second network device, such that communications between the client and the server pass through the first secure connection between the client and the second network device;
wherein the indication that the initiation of the secure connection marks the end of interactions that require a private key and the start of interactions that require only a symmetric key.

22. The method of claim 21, wherein intercepting the secure connection request from the client comprises:
receiving a secure connection request previously intercepted by an intercepting entity in-path with the client and redirected to the first network device.

23. The method of claim 21, wherein intercepting the secure connection request from the client comprises:
intercepting the secure connection request from the client via an in-path network connection with the client.

24. The method of claim 21, further comprising:
receiving first data from the server directed to the client at the first network device;
communicating second data corresponding to the first data from the first network device to the second network device; and
communicating third data corresponding to the second data from the second network device to the client via the first secure connection.

25. The method of claim 24, wherein the second data comprises an optimized version of the first data and the third data comprises a de-optimized version of the second data equivalent to the first data.

26. The method of claim 21, further comprising:
receiving first data from the client directed to the server at the second network device via the first secure connection;
communicating second data corresponding to the first data from the second network device to the first network device; and
communicating third data corresponding to the second data from the first network device to the server.

27. The method of claim 26, wherein the second data comprises an optimized version of the first data and the third data comprises a de-optimized version of the second data equivalent to the first data.

28. The method of claim 21, wherein initiating the first secure connection with the client in response to the secure connection request comprises determining if the server is capable of establishing a secure connection with the client in response to the secure connection request.

29. The method of claim 28, wherein determining if the server is capable of establishing a secure connection with the client in response to the secure connection request comprises establishing a second secure connection between the first network device and the server.

30. The method of claim 21, wherein the second network device initiates communications with the client via the first secure connection using a symmetric encryption key in response to the indication.

31. The method of claim 30, wherein the indication includes the symmetric encryption key.

32. The method of claim 30, further comprising:
selecting a symmetric encryption key by the second network device;
communicating the selected symmetric encryption key to the first network device; and
communicating the selected symmetric encryption key from the first network device to the client during or after the initiation of the first secure connection.

33. The method of claim 21, wherein the first and second network devices communicate via a second secure connection.

34. The method of claim 33, wherein the first and second network devices initiate the second secure connection using public-key cryptography and certificates signed by a mutually-trusted certifying authority.

35. The method of claim 33, wherein the first and second network devices initiate the second secure connection using self-signed certificates and procedures for deliberate acceptance of such certificates.

36. The method of claim 33, wherein the second secure connection uses a security different from a security of the first secure connection.

37. The method of claim 33, wherein the second secure connection uses a security similar to a security of the first secure connection.

38. The method of claim 33, wherein the second secure connection communicates data associated with the first secure connection and an additional secure connection between the first and second network devices communicates data associated with an additional client.

39. The method of claim 38, wherein the length of use of a single inner channel connection is determined by a number of outer channel connections that have used the single inner channel connection.

40. The method of claim 38, wherein the length of use of a single inner channel connection is determined by time elapsed since the first use of the single inner channel connection.

41. The method of claim 38, wherein a pool of inner-channel connections is available for reuse.

42. The method of claim 21, where a server-side outer channel connection is reused for multiple client-side outer channel connections.

43. The method of claim 42, wherein the length of use of a single server-side outer channel connection is determined by the number of client-side outer channel connections that have used it.

44. The method of claim 42, wherein the length of use of a single server-side outer channel connection is determined by time elapsed since the first use of the single server-side outer channel connection.

45. The method of claim 42, wherein a pool of inner-channel connections is available for reuse.

46. The method of claim 28, wherein determining if the server is capable of establishing a secure connection with the client in response to the secure connection request comprises:
accessing a secure connection cache for information characterizing previous secure connection requests denied by the server;
comparing characteristics of the secure connection request with the information;
forwarding the secure connection request to the server in response to a determination that the characteristics of the secure connection request are similar to the information, thereby enabling the server to establish a secure connection with the client.

47. The method of claim 46, further comprising:
invalidating at least a portion of the secure connection cache in response to a change in private key information stored at the first network device.

48. The method of claim 46, further comprising:
sharing at least a portion of the secure connection cache with an additional network device connected with the server.

49. The method of claim 21, wherein assuming control of the secure connection with the client at the second network device includes:
detecting a secure connection renegotiation request by the client at the second network device;
communicating an indicator of the secure connection renegotiation request from the second network device to the first network device;
in response to the indicator of the secure connection renegotiation request, assuming control of the first secure connection with the client at the first network device;
determining at the first network device whether the first secure connection is renegotiable by the first network device;
in response to determining that the first secure connection is renegotiable by the first network device:
renegotiating the first secure connection with the client; and
forwarding the secure connection renegotiation request to the server in response to a determination that the first network device cannot renegotiate the first secure connection, thereby enabling the server to renegotiate a secure connection with the client.

50. A method of communicating securely with a client, the method comprising:
observing an initiation of a secure connection between a client and a server at a first network device, wherein the first network device receives security information from the server;

receiving an indication that the initiation of the secure connection between the client and the server is complete;

communicating an indicator from the first network device to a second network device that both indicates that the secure connection has been established between the client and the first network device and that is also useable by the second network device to process secure communications that occur between the client and the first network device;

assuming control at the second network device of the secure connection with the client on behalf of the server, the secure connection having been established between the client and the first network device;

receiving data directed to the client from the server via the second network device; and communicating the data to the client via the secure connection;

wherein the indication that the initiation of the secure connection marks the end of interactions that require a private key and the start of interactions that require only a symmetric key.

51. The method of claim 50, wherein the indication that the initiation of the secure connection is complete includes at least one attribute enabling the secure communication of data via the secure connection.

52. The method of claim 51, wherein the attribute includes a symmetric key.

53. The method of claim 50, wherein the server is a VPN device.

54. The method of claim 50, wherein assuming control of the secure connection comprises:
determining an attribute of the secure connection from observing the initiation of the secure connection.

55. A method of initiating a secure connection between a client and a server, wherein traffic over the secure connection is to pass from the client through a first proxy and a second proxy to the server, the method comprising:

intercepting, at the first proxy, a connection request that is from the client, the connection request directed to the server;

intercepting, at the second proxy, a secure connection request that is from the client, the secure connection request directed to the server requesting establishment of the secure connection with the server, wherein establishment of the secure connection with the server requires a first datum that is provided by the server;

obtaining the first datum at the second proxy;

establishing authenticated communication between the first proxy and the second proxy; and after establishing authenticated communication between the first proxy and the second proxy, providing data from the second proxy to the first proxy, wherein such data is data specific to the secure connection and is data required to establish the first proxy as a termination of the secure connection with the client and wherein such data is provided to the first proxy using the authenticated communication between the first proxy and the second proxy;

wherein the first datum is a private key of the server, wherein a session key is required for the authenticated communication between the first proxy and the second proxy, and wherein the data required to establish the first proxy as the termination of the secure connection with the client is the session key.

56. The method of claim 55, further comprising:

establishing a first unsecured connection between the client and the first proxy prior to providing the data from the second proxy to the first proxy;

establishing a second unsecured connection between the first proxy and the second proxy prior to intercepting the secure connection request; and establishing authenticated communication between the client and the second proxy using the first datum; and obtaining the first datum from the server for use by the second proxy.

57. The method of claim 55, wherein the first datum includes at least one of private key information for the server, certificate information for the server, exchanged self-signed certificates, and exchanged externally-signed certificates.

58. The method of claim 55, wherein the first proxy and the second proxy are identically configured.

* * * * *